(12) United States Patent
Gfrörer et al.

(10) Patent No.: US 7,425,311 B2
(45) Date of Patent: Sep. 16, 2008

(54) HOLDING DEVICE

(75) Inventors: Andreas Gfrörer, Königsdorf (DE); Josef Grassl, Berchtesgaden (DE); Wolfgang Streit, Hallein (AT)

(73) Assignee: Tecan Trading AG, Mannedorf (CH)

( * ) Notice: Subject to any disclaimer, the term of this patent is extended or adjusted under 35 U.S.C. 154(b) by 558 days.

(21) Appl. No.: 10/465,429

(22) Filed: Jun. 18, 2003

(65) Prior Publication Data
US 2004/0013576 A1 Jan. 22, 2004

Related U.S. Application Data

(63) Continuation of application No. PCT/CH02/00012, filed on Jan. 10, 2002.

(30) Foreign Application Priority Data

| Jan. 26, 2001 | (CH) | .................................... 0144/01 |
| May 25, 2001 | (CH) | .................................... 0969/01 |

(51) Int. Cl.
*B01L 9/00* (2006.01)
*B01L 3/00* (2006.01)
*G01N 21/00* (2006.01)
*A47G 1/06* (2006.01)

(52) U.S. Cl. .................. 422/104; 422/63; 422/102; 40/405; 40/710; 40/735

(58) Field of Classification Search ............... 422/102, 422/104, 63; 40/710, 405, 735
See application file for complete search history.

(56) References Cited

U.S. PATENT DOCUMENTS

| 3,773,183 | A | * | 11/1973 | Johnson ................... 211/85.14 |
| 4,159,875 | A | * | 7/1979 | Hauser ...................... 356/244 |
| 4,209,923 | A | * | 7/1980 | Wendt ......................... 40/710 |
| 4,682,890 | A | * | 7/1987 | de Macario et al. ......... 356/244 |

(Continued)

FOREIGN PATENT DOCUMENTS

JP          6103313 B         5/1991

(Continued)

OTHER PUBLICATIONS

Joseph Ogando, Thermally conductive plastics beat the heat, Sep. 17, 2001, Design News for Mechanical and Design Engineers.*

Primary Examiner—Jill Warden
Assistant Examiner—Neil Turk
(74) Attorney, Agent, or Firm—Notaro & Michalos P.C.

(57) ABSTRACT

A holding device for at least one object carrier, the object carrier being suitable to receive one or more organic and/or inorganic samples and comprising materials such as glass, plastic, silicon, pyrolytic graphite, and/or metal, this holding device being configured to be gripped by grippers of a robot. The holding device comprising two essentially parallel lengthwise walls and two essentially parallel transverse walls which extend substantially at right angles from the lengthwise walls. Holding devices according to preferred embodiments are constructed in a frame shape, wherein the lengthwise and transverse walls define a frame surrounding at least one opening which completely transverses the device. Holding devices according to further embodiments are constructed a plate shape, in that the region between the lengthwise walls and transverse walls is implemented as a carrying surface. All embodiments comprising gripping surfaces on the external surface profile of the lengthwise and transverse walls.

16 Claims, 5 Drawing Sheets

U.S. PATENT DOCUMENTS

| | | | | |
|---|---|---|---|---|
| 5,147,042 A | * | 9/1992 | Levy | 206/456 |
| 5,569,607 A | * | 10/1996 | Simon et al. | 436/46 |
| 5,592,289 A | | 1/1997 | Norris | 356/244 |
| 5,595,710 A | * | 1/1997 | Van Dusen et al. | 422/104 |
| 5,609,826 A | * | 3/1997 | Cargill et al. | 422/99 |
| 6,004,512 A | * | 12/1999 | Titcomb et al. | 422/63 |
| 6,054,100 A | * | 4/2000 | Stanchfield et al. | 422/102 |
| 6,118,582 A | * | 9/2000 | Del Buono | 359/398 |

FOREIGN PATENT DOCUMENTS

| | | |
|---|---|---|
| JP | 411156 Y | 3/1992 |
| JP | 9196927 A | 7/1997 |
| JP | 11242038 | 9/1999 |
| WO | WO 94/23326 | 10/1994 |
| WO | WO 99/61152 | 12/1999 |
| WO | WO 00/16085 | 3/2000 |

* cited by examiner

HOLDING DEVICE

CROSS-REFERENCE TO RELATED APPLICATIONS

This application is a continuation of PCT/CH02/00012, filed on Jan. 10, 2002; which application claims the benefit of the priority of Swiss patent applications Nos. CH 0144/01 filed on Jan. 26, 2001 and CH 0969/01 filed May 25, 2001.

The entire disclosure of each of the above-mentioned application is hereby incorporated by reference.

TECHNICAL FIELD OF THE INVENTION

The present invention relates to a holding device for at least one carrier—particularly for an essentially plate-shaped object carrier which includes materials such as glass, plastic, silicon, pyrolytic graphite, and/or metal—the carrier being suitable to receive one or more organic and/or inorganic samples.

In laboratory analysis, the use of carriers for objects or samples, i.e., of object carriers, has been known for a long time. Depending on the type of sample which is to be examined, processed, and/or stored, essentially flat, plate-shaped object carriers are often suitable, e.g., for immobilized cells or tissue sections. If the samples include a liquid, the samples are, for example, dissolved or suspended in a liquid, then rather trough-shaped object carriers have proven themselves.

The type of treatment or examination of the samples also has an influence on the design and material of the object carrier. Therefore, glass object carriers are traditionally used for light microscopy and object carriers made of single-crystal silicon are used for scanning electron microscopy or those made of pyrolytic graphite for scanning tunneling microscopy. The use of carriers made of plastic (e.g. polycarbonate, polystyrene, or polyolefin) is also known. From biosciences, the use of plates, which have a flat or structured surface, on which biological and/or organic molecules are immobilized, as "biochips" is known. Metal plates are often used as object carriers for "MALDI TOF-MS" (Matrix Assisted Laser Desorption Ionization—Time of Flight Mass Spectrometry).

PROBLEMS RELATED TO PRIOR ART

Many laboratory processes work with samples which are immobilized on an object carrier, i.e., held by it. Such laboratory processes are known in, among other things, the fields of genomics or proteomics, which include the processing and examination of genetic substances, such as DNA (deoxyribonucleic acid), RNA (ribonucleic acid), and/or their parts in the form of oligonucleotides or proteins (proteins, e.g., in the form of antigens or antibodies and/or their parts in the form of polypeptides). Such processes and similar processes may include many working steps in various working stations: e.g., for the hybridization of DNA, first a sample array, i.e., a flat, uniform arrangement of samples, is produced using "spotting" or "arraying" on a glass object carrier for light microscopy. The samples are then typically subjected to one or more "linker and/or blocking steps". Subsequently, the actual hybridization step is performed, which is typically terminated with a washing procedure. Subsequently, the sample may be examined using a fluorescence microscope or other special detection devices.

It has proven very time-consuming and cumbersome to attach the sample carrier and/or object carrier in an appropriate processing station by hand every time for a working step and to remove it from this processing station by hand again after the working step is completed. In addition, such manipulations using the object carriers represent a source of damage and/or confusion of object carriers or even of the samples themselves. In addition, a danger of contamination of other samples or even a danger of infection for the laboratory workers may arise through repeated manipulation.

OBJECTS AND SUMMARY OF THE INVENTION

The object of the present invention is to suggest a device which simplifies the insertion and transfer of object carriers and minimizes the risk of damage or confusion of the samples and/or contamination or infection.

Such a holding device has the advantage that multiple samples may also be held and transported and/or stored simultaneously. Through the special grip surfaces for the gripper of a robot, such holding devices may be positioned automatically, i.e., by a robot controlled by a processor, in a processing, examination, or storage station, or removed there from. Once the object carriers have been attached to the holding device, the holding device is preferably always moved with the object carriers. The repeated manual manipulation of the object carriers may thus be dispensed with and the risky operations using the object carriers described above may also be dispensed with.

In addition to the many materials, the object carrier may also have many sizes, shapes, and surface structures. Thus, microplates having depressions, the "wells", are particularly suitable as trough-shaped object carriers for liquid samples or samples including a liquid. For automated handling of such microplates, which are also known as microtitration plates™ (trademark of Beckman Coulter, Inc., 4300 N. Harbor Blvd. P.O. Box 3100, Fullerton, Calif. 92834, USA), greatly differing devices already exist.

A preferred embodiment of the holding device according to the present invention is therefore distinguished in that it is implemented as an adapter whose external surface profile, height, and stackability—for placement in a microplate station of a sample analysis, sample processing, and/or sample storage system—essentially correspond to the external surface profile, the height, and the stackability of a microplate. Such a holding device is preferably constructed in a frame shape and includes two lengthwise walls running essentially parallel to one another and two transverse walls running essentially parallel to one another. In addition, it may include intermediate walls, which run essentially parallel to the lengthwise walls and/or transverse walls. Another preferred embodiment of the holding device according to the present invention is constructed in a plate shape.

If such holding devices, which are equipped with object carriers, have the shape of a standardized microplate, then they may be used as an adapter between object carriers, having practically any desired shape, size, and material, and the microplate handling robots and/or microplate stations of a sample analysis, sample processing, and/or sample storage system.

In the following, the microtitration plate™ already cited or also the SBS-Standard (Society for Biomolecular Screening, 36 Tamarack Ave. Suite 348, Danbury, Conn. 06811, USA): "Proposed SBS Standard 96 Well Microplate SBS 1a", Drawing No. 102005, Sheets 1-5 (Internet address: sbsonline.com/ disgrps/platestd/details.htm) are referred to as a microplate. Microplates having a higher number of wells (e.g., 384, 1536, etc. wells per microplate) are also referred to here as microplates, which are suggested and/or whose standard is being prepared, for example, having different overall heights, different capacities of the wells, and different angles of inclination of the side walls and/or of the external profile. It is essential in any case that the holding device according to the present invention is tailored to the shape and external dimensions of a typical microplate.

Holding devices having the shape of such microplates make the handling of the object carriers secured thereon easier, which must no longer be grasped directly between the process steps to be performed in the devices for automated handling of microplates. A further advantage of the use of such holding devices and/or adapters is that a significantly larger surface of the object carrier may be used for loading with samples, and therefore a further increase of the capacity in the processing and/or examination and/or storage of samples results.

BRIEF INTRODUCTION OF THE DRAWINGS

Preferred and exemplary embodiments of the holding device according to the present invention are described in more detail in the following with reference to schematic drawings—which merely illustrate the invention, but do not restrict its extent.

DETAILED DESCRIPTION OF THE INVENTION

Figure 1:
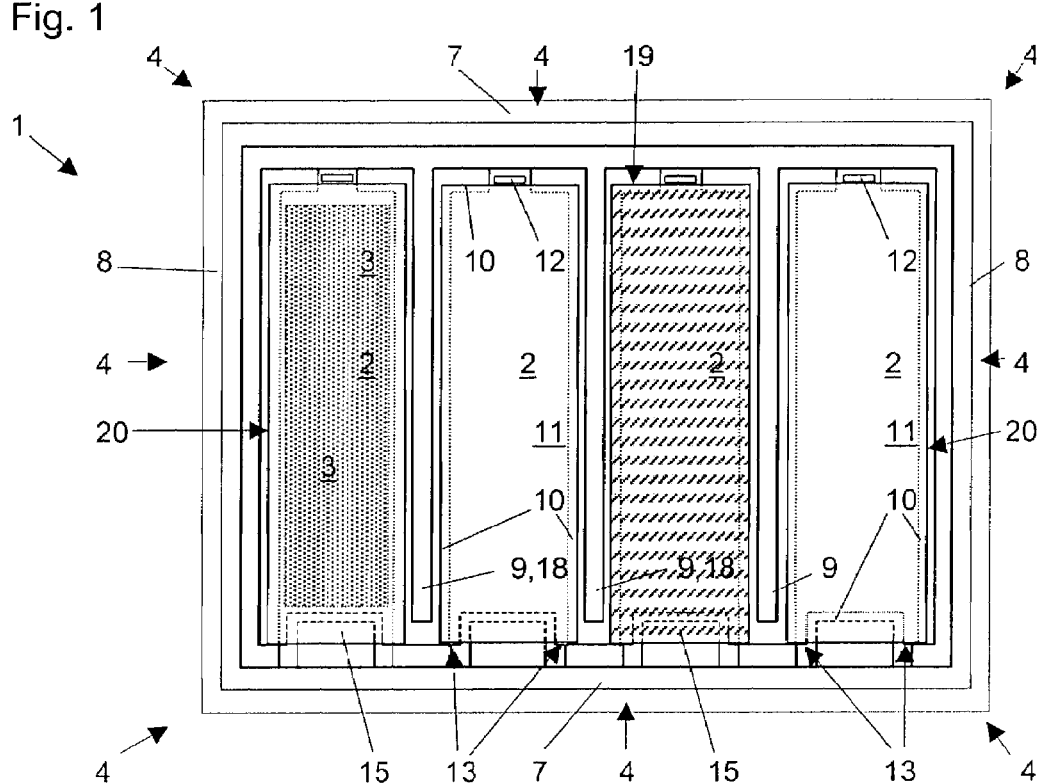
FIG. 1 shows a top view of a holding device, according to a first embodiment.

FIG. 1 shows a holding device 1 according to the present invention according to a first, frame-shaped embodiment. The four carriers 2 inserted in the holding device are glass object carriers for light microscopy in this case. Holding device 1 includes grip surfaces 4—for being gripped by a robot, particularly by a microplate handling robot—which may have grippers of this robot applied to them.

These grip surfaces 4 are preferably each located opposite one another on both lengthwise walls 7 or on both transverse walls 8. It is especially preferred for one grip surface 4 to be positioned in the region of external surface profile 5 of each lengthwise wall 7 or each transverse wall 8 of holding device 1. This external surface profile 5 (cf. FIGS. 3 to 5) of holding device 1 essentially corresponds to the external surface profile of microplates, as described in more detail above. Using this arrangement a microplate handling robot (not shown), which is typically equipped with two grippers, may apply its grippers to this holding device 1 in the region of gripping surface 4 and, thanks to the friction lock thus generated, pick up the holding device perfectly and transport it safely.

Applying a vacuum to gripping surfaces 4 may allow even more careful receiving by a handling robot. An alternative application of the gripping surfaces using form fit is, for example, made possible in that a four-armed robot is moved over the center of a microplate and grips the holding device in the region of its four corners, in that it uses each of its four grippers, which are tailored to the corner geometry of microplates for this purpose, and moves each of them toward the center of holding device 1.

Holding of holding devices 1 according to the present invention on and/or in microplate stations without play may be very important—particularly for microplates having, for example, 1536 wells or for fine arrays—so that the position of the wells and/or of the sample points may be arrived at again unequivocally. This holding without play may be produced via gripping tools which are applied to holding device 1 in the region of the corners and/or external and/or internal surfaces. The necessary gripping tools are preferably arranged in this case on or in the microplate stations. As an alternative to gripping tools, such a microplate station/holding device combination may—for holding of holding device 1 in relation to the microplate station without play —be equipped with a pushbutton-latch mechanism known per se, having retaining springs (preferably made of metal) or pressure pins.

Another preferred alternative is the arrangement of these grip surfaces 4 on the bottom of holding device 1, so that the robot may receive the holder plate like a forklift. This receiving is made easier by an entry opening 17 (cf. FIGS. 3 to 5). This entry opening 17 also makes stacking of holding devices 1 according to the present invention easier, as is described in more detail below.

A microplate handling robot may be used not only to receive the holding device and simply lay it down somewhere on a table; it may also be used to place a holding device 1 in a targeted way in a microplate station of a sample analysis and/or sample processing and/or sample storage system. For this purpose, holding device 1 according to the present invention includes a stacking surface profile 6 (cf. FIGS. 3 to 5), which essentially corresponds to the stacking surface profile of a microplate.

Through the extensive correspondence of external surface profile 5 and stacking surface profile 6 to the corresponding dimensions of a microplate, holding device 1 according to the present invention becomes an adapter between practically any desired carrier of objects (whether they are more plate-shaped or trough-shaped) and all devices vices and systems (whether or not they are equipped with a handling robot and/or a computer control system) for analysis and/or processing and/or storage of samples in microplates.

Frame-shaped holding device 1 shown in FIG. 1 includes two lengthwise walls 7, two transverse walls 8, and three intermediate walls 9, which run essentially parallel to transverse walls 8. All of these components have an offset 10 on which at least part of a carrier 2 may be laid. The size of a carrier 2 (third from left) is emphasized by slanted hatching and the region of carrier 2 (first from left) occupied by samples 3 is shown dotted. Carrier 2 used has a spring element 12 applied to it approximately in the middle of its transverse side 19 in this case. In this case, spring element 12 exercises a spring force on this carrier 2 which is directed in the direction essentially parallel and/or perpendicular to surface 14 of the carrier and through which this carrier 2 is pressed against a stop 13 arranged on both sides of a grip opening 15. These spring elements 12 are capable of compensating all typical manufacturing tolerances or standard variations in glass object carriers. Such spring elements 12 may—thanks to the long spring travel—also compensate the different standard sizes of the glass object carriers. Therefore, holding device 1 according to the present invention forms an adapter and/or an "interface" for almost any desired glass object carriers for light microscopy and systems for handling microplates.

The following table provides an overview of the most commonly used glass object carriers:

| Type | Inch: 1 × 3 inches | Metric: 25 × 75 mm |
|---|---|---|
| Dimensions: | | |
| Length × width (Tolerances) | 76.2 mm × 25.4 mm (±0.5 mm) | 76 mm × 25 mm (±0.5 mm) |
| Thickness: | | |
| "standard" "thick" 1.2 mm (±0.1 mm) | 1.02 mm (±0.05 mm) | 1.02 mm (±0.05 mm) |
| Processing: | | |
| Corners | sharp, beveled | sharp, rounded |
| Edges | sharp, beveled | sharp |
| Surfaces | polished, sandblasted, painted on one or both sides | polished, sandblasted painted on one or both sides |

(according to: Schermer, M. J.: Confocal scanning microscopy in microarray detection; in "DNA Microarrays, A pratical approach"; Mark Schena (ed.), Oxford University Press 1999, 17-42)

Not only the dimensions, but also the different treatments of the corners and edges of these object carriers are compensated by the implementation of holding device 1. On the one hand, the spring travel of spring elements 12 is influential in this case. On the other hand, intermediate walls 9 are preferably placed far enough from transverse walls 8 that the object carrier may be inserted into depression 11 or the recessed portion with considerable play. In this case, offsets 10 are implemented as wide enough and/or projecting widely enough beyond ribs 18 that carrier 2 may not fall through the frame in any case.

To insert a glass object carrier 2 into the holding device, the object carrier has two fingers of a hand (preferably using thumb and middle finger, or by a robot) applied to its transverse sides 19, is removed from a fresh stack of object carriers in this way, and is inserted into a depression 11 with the middle finger in front, until carrier 2 strikes against spring element 12. After the middle finger is pulled away, the thumb is used to press against the pressure of spring element 12 until carrier 2 moves over stop 13 with the thumb and may be laid on offset 10. After the thumb is pulled away, spring element 12 now presses this carrier 2—through the spring force directed in the direction essentially parallel and/or perpendicular to surface 14 of the carrier—against stop 13. This stop 13 preferably has an undercut, so that carrier 2 is pressed by the spring force of spring element 12 against offset 10 and may not yield upward. Carriers 2 inserted in a holding device 1 in this way are thus securely held and may not fall out, even if holding devices 1 loaded with carriers 2 are moved abruptly into any arbitrary spatial position.

The removal of a carrier 2 from holding device 1 is analogously performed in the reverse sequence. In order for the thumbs to have the necessary freedom of movement for inserting or removing a carrier 2, holding device 1 preferably has grip openings 15, which the thumbs may dip into somewhat.

Surface 14 itself is only touched slightly in the regions of transverse sides 19 by the insertion of object carrier 2 described. If the regions near lengthwise sides 20 of carrier 2, which may be left open for reasons of safety due to the dimensional differences of the carrier, are also disregarded, then at least 66% of surface 14 of carrier 2 is effectively available for receiving samples 3 (shown dotted in FIG. 1).

Figure 2:
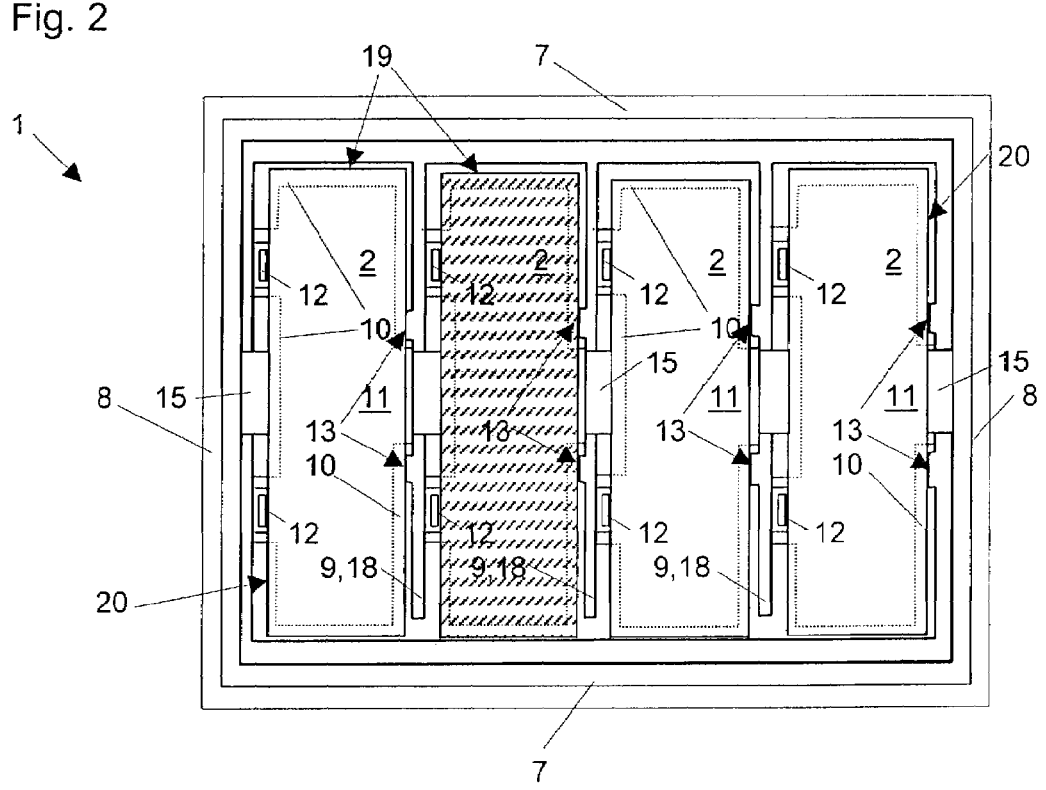
FIG. 2 shows a top view of a holding device, according to a second embodiment.

FIG. 2 shows a top view of a frame-shaped holding device 1, according to a second embodiment. In contrast to the first embodiment shown in FIG. 1, in this case two spring elements 12 are located on each of transverse walls 8 and intermediate walls 9 essentially parallel thereto. Correspondingly, stops 13 are each positioned opposite, also on transverse walls 8 and on intermediate walls 9. Grip openings 15 are also present, so that the insertion and removal of object carriers may be performed in the way described above; however, with the difference that carrier 2 may be gripped on both of its lengthwise sides 20 in this case. If the two embodiments shown up to this point are compared, it may be maintained that in the second embodiment the length of object carrier 2 plays an even smaller role. Both external surface profile 5 and stacking surface profile 6 advantageously correspond at least essentially to the corresponding profiles of a microplate.

Figure 3:
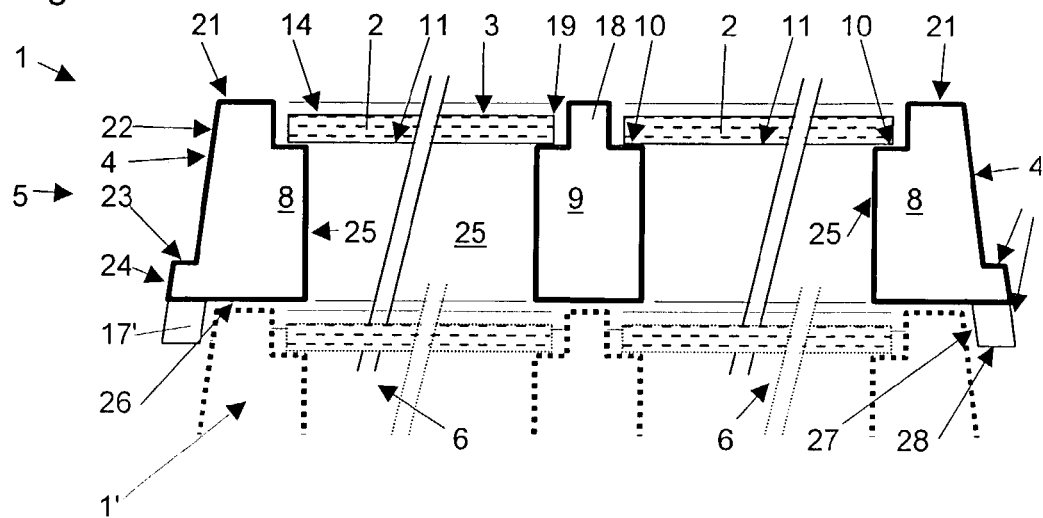
FIG. 3 shows a vertical longitudinal section through the holding device in FIG. 1, according to the first embodiment.

FIG. 3 shows a vertical longitudinal section through the holding device in FIG. 1, according to the first embodiment. Actually, a partial section through a stack of such holding devices 1 is shown, bottom holding device 1' of the same type being shown using dashes. Two inserted carriers 2, which rest on offsets 10 of transverse walls 8 and intermediate walls 9, are also recognizable. Carriers 2 have samples 3 on their surface 14. The dimensions of depressions 11 are defined by the mutual geometric relationships of these offsets 10, stacking shoulder 21 (which preferably simultaneously represents the upper edge of holding device 1), and/or ribs 18.

External surface profile 5 of this holding device 1 according to the present invention includes a stacking shoulder 21, an adjoining upper external surface 22, a step 23, a lower external surface 24, and a placement surface 28. Stacking surface profile 6 of this holding device 1 according to the present invention includes a stacking surface 26, a lower internal surface 27, and placement surface 28. Both external surface profile 5 and stacking surface profile 6 advantageously correspond at least essentially to the corresponding profiles of a microplate.

When stacking such holding devices 1, 1', as shown in FIG. 3, stacking surface 26 of upper holding device 1 lies on stacking shoulder 21 of lower holding device 1'. At the same time, lower internal surface 27 of upper holding device 1 preferably presses so closely onto upper external surface 22 of lower holding device 1' that both holding devices 1, 1' are centered on one another. Parts of lower internal surface 27 of a holding device 1, 1' are preferably left open by an entry opening 17, 17', which allows the lateral introduction of one or more grippers of a microplate handling robot (not shown). This lateral introduction of the grippers under holding device 1 and/or their application onto holding device 1 in the region of its external surfaces 22, 24 may be performed transverse to lengthwise walls 7 or to transverse walls 8, or even diagonally to holding device 1. Entry openings 17, 17' preferably have different heights, so that entry openings 17 in lower external surfaces 24 of lengthwise walls 7 are shorter than entry openings 17' in lower external surfaces 24 of transverse walls 8, latter entry openings 17' preferably extending right up to the level of stacking surface 26. Placement surface 28 therefore forms an angled foot in each corner for holding device 1.

Figure 4:
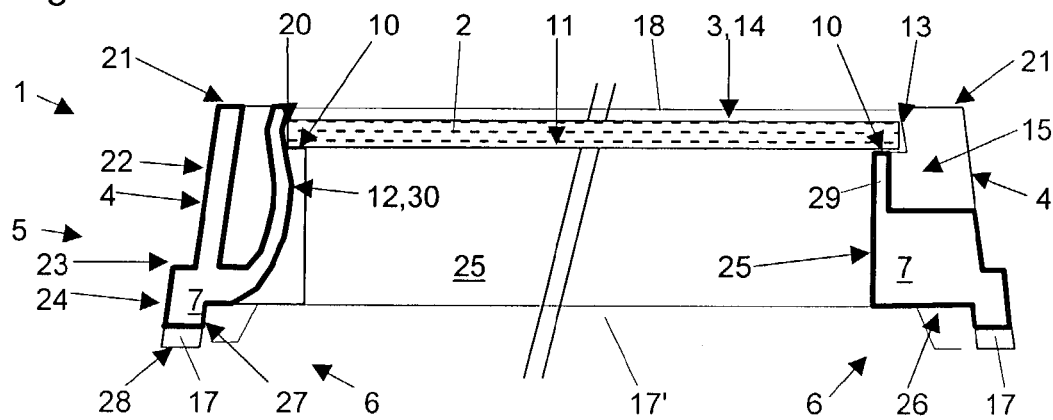
FIG. 4 shows a vertical cross-section of the holding device in FIG. 1, according to the first embodiment.

FIG. 4 shows a vertical cross section through the holding device in FIG. 1, according to the first embodiment. External surface profile 5 includes a stacking shoulder 21, an adjoining upper external surface 22, a step 23, a lower external surface 24, and a placement surface 28. Stacking surface profile 6 includes a stacking surface 26, a lower internal surface 27, and placement surface 28. An inserted carrier 2, which rests on offsets 10 of lengthwise walls 7, is recognizable and has samples 3 on its surface 14. Depression 11 is defined by the mutual relationships of these offsets 10, stacking shoulder 21 (which preferably simultaneously represents the upper edge of holding device 1), and/or ribs 18. Entry openings 17, 17', which have different heights, and placement surface 28, which forms an angled foot for holding device 1 in each corner, may be easily recognized. Both external surface profile 5 and stacking surface profile 6 advantageously correspond at least essentially to the corresponding profiles of a microplate.

Carrier 2 is a glass object carrier which has a spring element 12 applied to its transverse sides 19. Spring element 12 is preferably produced in one piece with holding device 1 from plastic in an injection molding method. Its shape is selected in such a way that—in spite of the relatively long spring travel of the part applied to carrier 2, up to several millimeters—only slight deformation occurs and therefore the tension of spring element 12 is as small as possible. The upper end of spring element 12 is preferably slanted toward the carrier, so that, in addition to a horizontal component of the spring force, a vertical component also arises. It is clear that the horizontal component presses carrier 2 against stop 13 and the vertical component (of the spring force exercised by spring element 12) presses carrier 2 against offset 10. This stop 13 preferably has an undercut so that carrier 2 is pressed against offset 10 by the spring force of spring element 12 and may not yield upward. Carriers 2 inserted in a holding device 1 in this way are therefore securely held and may not fall out, even if holding devices 1 loaded with carriers 2 are abruptly moved into any desired spatial position and held and/or processed there. Grip opening 15 is also easily visible in FIG. 4, which is preferably implemented in such a way that a rear wall 29, which delimits grip opening 15, lies behind transverse side 19 of inserted carrier 2. In this way, it is ensured that carrier 2 may be guided securely during insertion into holding device 1 and/or during removal from holding device 1—for example using the thumbs.

Alternative production methods for spring element 12 and holding device 1 include, for example, stereo lithography and particularly methods for producing larger numbers of parts, such as vacuum casting and multiphase injection methods.

Figure 5:
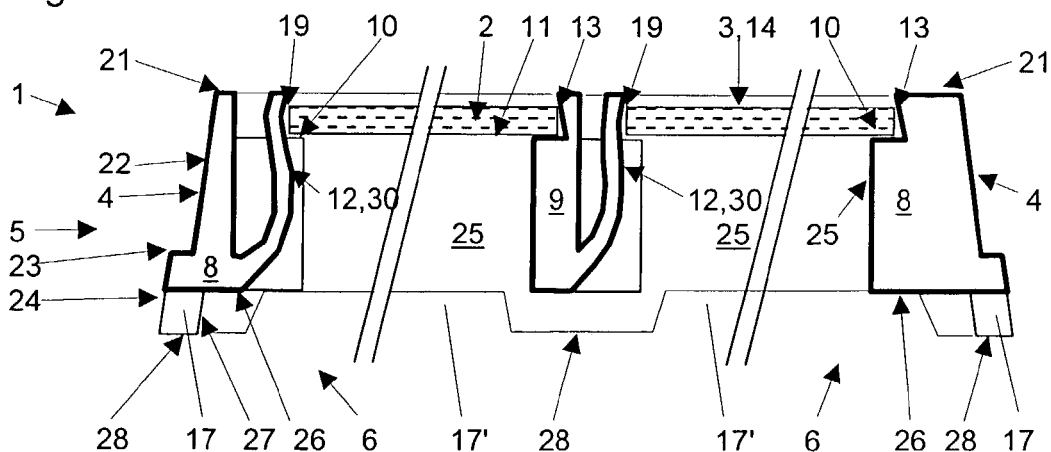
FIG. 5 shows a vertical longitudinal section through the holding device in FIG. 2, according to the second embodiment.

FIG. 5 shows a vertical longitudinal section through the frame-shaped holding device in FIG. 2, according to the second embodiment. In contrast to the first embodiment, in this case spring elements 12 are located on both transverse walls 8 and intermediate walls 9, which are essentially parallel thereto. Accordingly, stops 13 are positioned opposite, also on transverse walls 8 and intermediate walls 9. Grip openings 15 are not visible on this longitudinal section. Entry openings 17, 17' in lower external surface 24 are implemented having the same height in this case and reach right up to the lower edge of stacking surface 26. In this case, entry openings 17 are interrupted in the region of each transverse wall 8, so that additional feet, which support holding device 1, are provided using placement surfaces 28. Additional increase of the stability may be achieved if no entry openings are implemented. The implementation of spring elements 12 and stops 13 essentially corresponds to that of the first embodiment of holding device 1. Both external surface profile 5 and stacking surface profile 6 advantageously correspond at least essentially to the corresponding profiles of a microplate.

Figure 6:
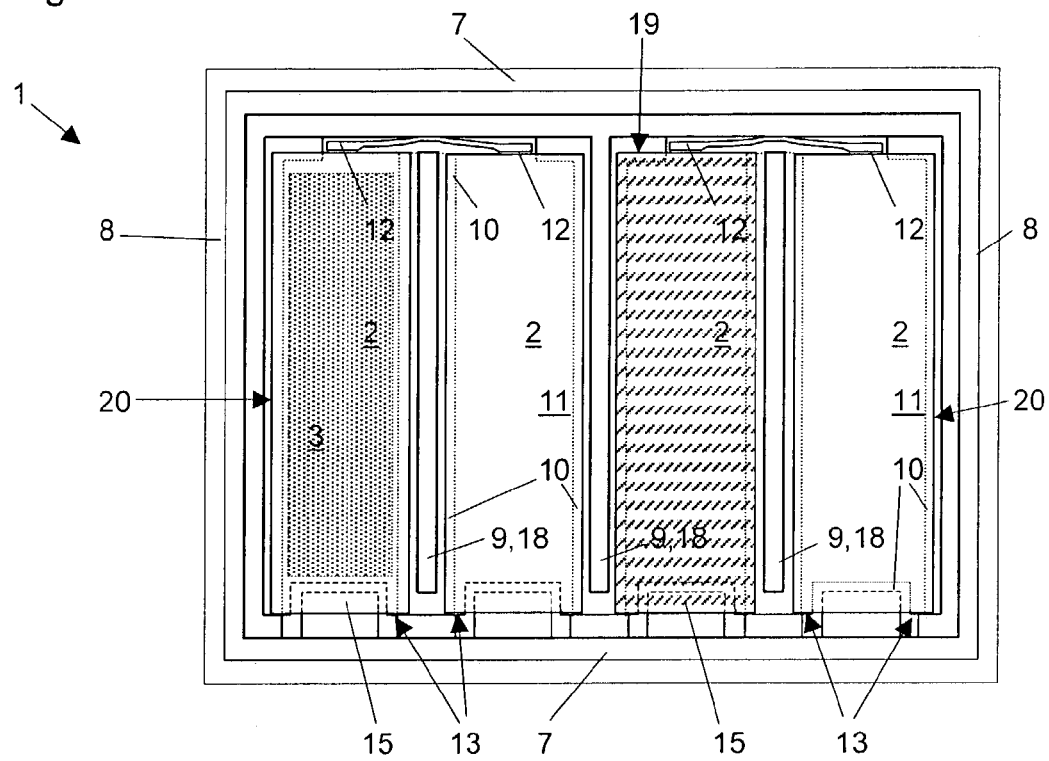
FIG. 6 shows a top view of the holding device, according to a third embodiment.

FIG. 6 shows a top view of a frame-shaped holding device 1, according to a third embodiment. In contrast to the first embodiment, in which spring elements 12 are positioned standing, in this case spring elements 12 are positioned lying. However, they engage in a similar way in the central region of transverse sides 19 of carrier 2 and also generate a horizontal spring force component, which presses carrier 2 against stops 13, and a vertical component, which presses carrier 2 onto offset 10. These stops 13 also preferably have an undercut, so that carrier 2 is pressed against offset 10 by the spring force of spring element 12 and may not yield upward. Both external surface profile 5 and stacking surface profile 6 advantageously correspond at least essentially to the corresponding profiles of a microplate.

Figure 7:
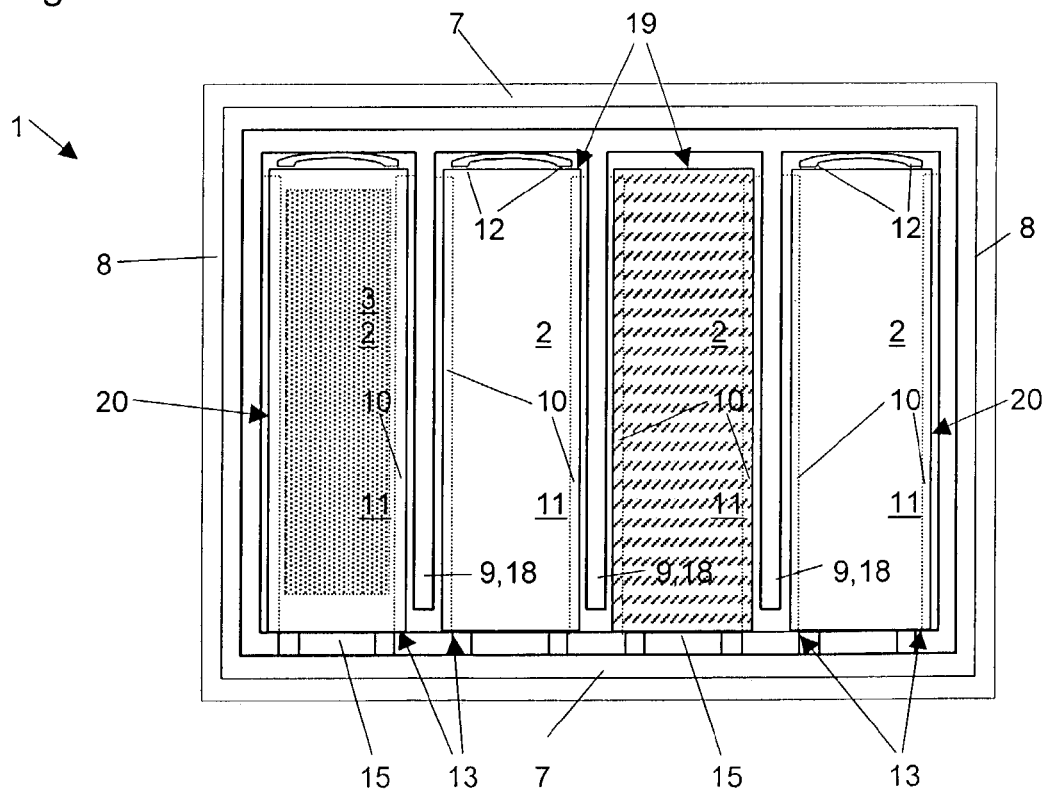
FIG. 7 shows a top view of a holding device, according to a fourth embodiment.

FIG. 7 shows a top view of a frame-shaped holding device 1, according to a fourth embodiment. In contrast to the third embodiment, in which one leg 30 of two-legged spring element 12 is applied to each carrier, in this fourth embodiment, each carrier 2 has both legs of a two-legged spring element 12 applied to it. Spring elements 12 do engage in a similar way on transverse sides 19 of carrier 2, but are applied to them outside their central region. In this case as well, spring elements 12 also generate a horizontal spring force component, which presses carrier 2 against stops 13, and a vertical component, which presses carrier 2 onto offset 10. These stops 13 also preferably have an undercut, so that carrier 2 is pressed by the spring force of spring element 12 against offset 10 and may not yield upward. In this fourth embodiment, the implementation of rear wall 29 was dispensed with and the offsets are only implemented along transverse walls 8 and intermediate walls 9. Grip openings 15 are implemented here as simple openings in the upper external surface of lengthwise walls 7. Both external surface profile 5 and stacking surface profile 6 advantageously correspond at least essentially to the corresponding profiles of a microplate.

Figure 8:
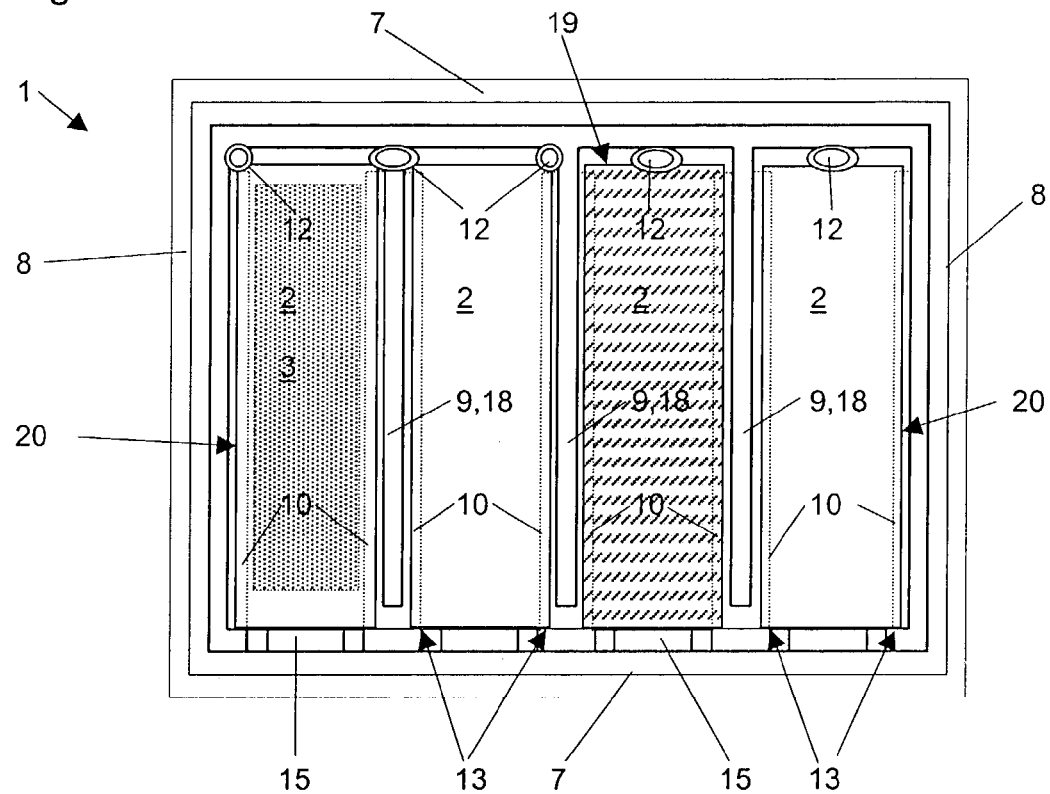
FIG. 8 shows a top view of a holding device, according to a fifth embodiment.

FIG. 8 shows a top view of a frame-shaped holding device 1, according to a fifth embodiment. In contrast to the fourth embodiment, in which spring elements 12 are preferably produced from plastic in one piece with holding device 1 in an injection molding method, in this case spring elements 12, in the form of highly flexible tubes made of, for example, silicone rubber, are glued, welded, or pressed into or onto upper internal surfaces 25 of holding device 1, preferably in or on appropriate depressions. As FIG. 8 shows, these tubes used as spring elements 12 may be positioned in the corner regions (shown for the two left carriers) or in the central regions (shown for the two right carriers) of carriers 2 and correspondingly have different diameters. Stops 13 and grip openings 15 are implemented as in the fourth embodiment of holding device 1. Both external surface profile 5 and stacking surface profile 6 advantageously correspond at least essentially to the corresponding profiles of a microplate.

Figure 9:
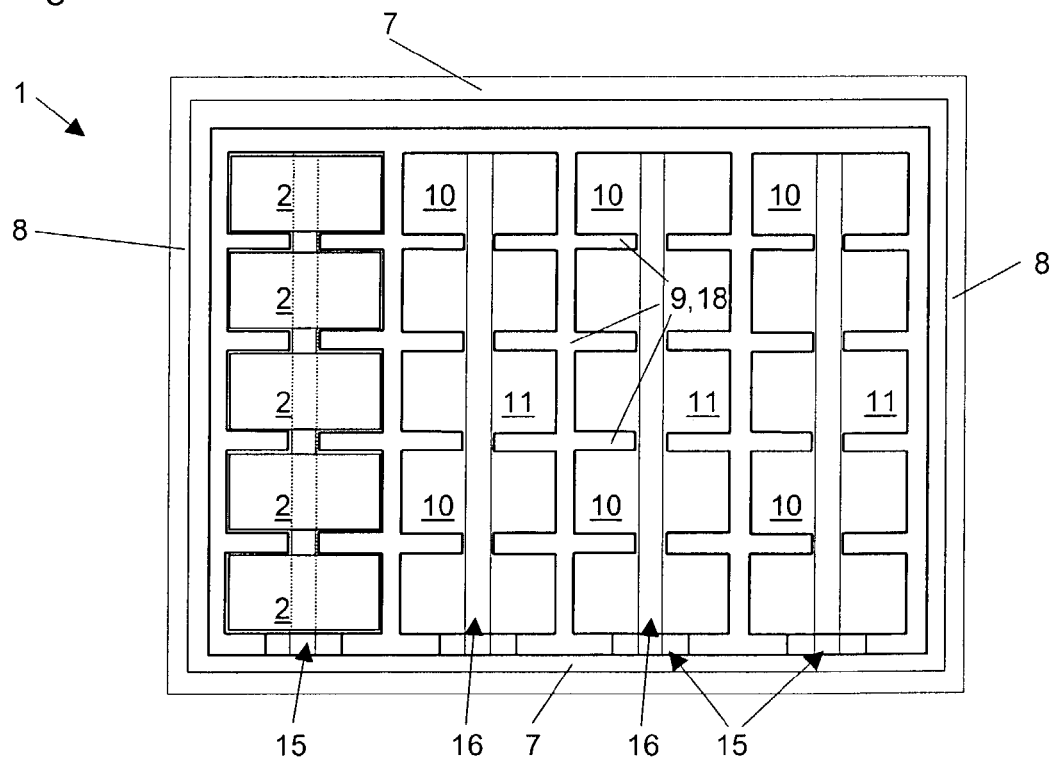
FIG. 9 shows a top view of a holding device, according to a sixth embodiment.

As an alternative to FIGS. 1 to 8 shown, FIG. 9 shows a plate-shaped holding device 1. In this sixth embodiment, the dimensions of depressions 11 are tailored precisely to the carrier to be inserted, so that each of these carriers 2 may be received essentially without play by this depression 11. The embodiment is suitable for carriers 2 in the form of silicon plates, metal plates, or other very precisely producible object carriers, which are at most tilted somewhat after being inserted into holding device 1, but do not have to be rotated. The holding essentially without play is therefore sufficient to prevent slipping of the object carriers, so that even for the finest arrays, the positions of individual samples 3 may be determined and maintained unequivocally.

To ease the insertion and removal of carrier 2, which is practically possible only in the perpendicular direction in relation to stacking shoulder 21 of holding device 1, holding device 1 has grip openings 15 and grip grooves 16. For example, individual carriers 2 may be inserted or removed easily using tweezers. In this case, the carrier may be grasped from underneath thanks to grip grooves 16, which are preferably continuous. It is clear that the shape and size of the depressions must be tailored to the object carriers to be used. The carriers may—notwithstanding the rectangular shape shown—also have other polygonal shapes, such as triangles, squares, pentagons, hexagons, or even curved shapes such as circular disks. The surface of such carriers 2 may be flat in this case or have structures such as bumps or depressions for receiving samples. If object carriers 2 are sufficiently heavy, they may be provided some play in the horizontal direction in relation to depression 11. Even in this case, using somewhat skilled handling, carriers 2 may be prevented from falling out of depressions 11.

Such a plate-shaped holding device 1 may be produced from metal and/or include parts made of metal or made of electrically conductive plastics. This is particularly advantageous if electrical contact must be produced to object carriers 2 and/or samples 3, whether this is to subject the samples to a specific electrical potential or even to ground the samples. Alternately—depending on the application—entire plate-shaped holding device 1 may be produced from metals such as aluminum, stainless-steel, etc. However, it may also be sufficient to only implement the actual receiver for carrier 2, having depressions 11, as a relatively thin metal plate. Both external surface profile 5 and stacking surface profile 6 advantageously correspond at least essentially to the corresponding profiles of a microplate.

Figure 10:
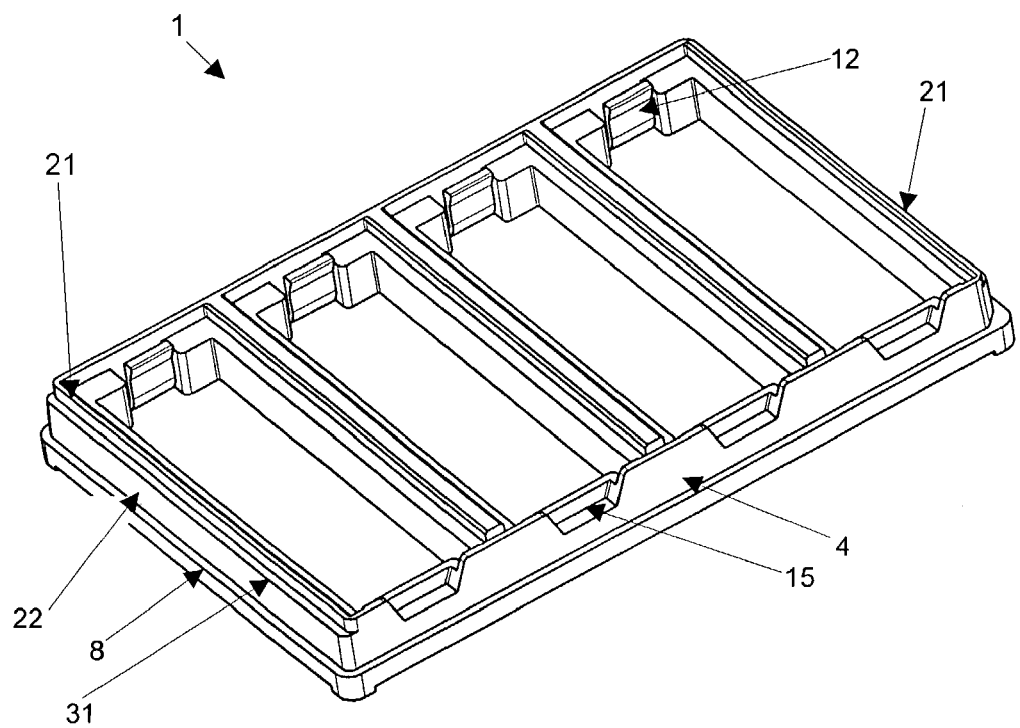
FIG. 10 shows a first 3-D illustration of the holding device, according to a seventh embodiment.
Figure 11:
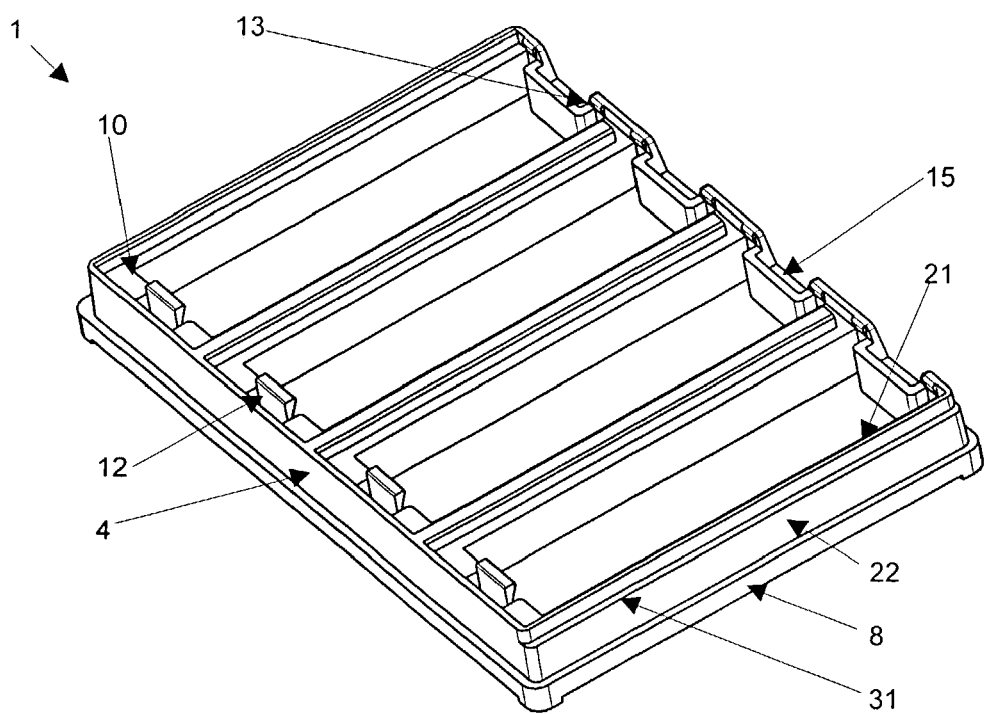
FIG. 11 shows a second 3-D illustration of the holding device, according to the seventh embodiment.

FIGS. 10 and 11 show a first and second, respectively, 3-D illustration of holding device 1, according to a seventh embodiment. This seventh embodiment essentially corresponds to the first embodiment and is distinguished in that, in upper external surfaces 22 of transverse walls 8, a second step 31 extends near and parallel to stacking shoulder 21. This second step 31 additionally eases the stacking of holding devices. In the figures, corresponding features are provided with the same reference numbers. Even if it is not expressly noted each time in the description, the remarks also apply for these features. Further combinations of the features shown and/or described are included in the extent of the present invention.

Examples of sample analysis devices are: light microscopes, fluorescence microscopes, MALDI TOF-MS systems, array/biochip scanner/imager, and cell counters. Examples of sample processing devices are: hybridization stations, incubators, washing stations, staining stations, MALDI TOF-MS systems, arrayers and/or spotters for applying discrete sample distributions or devices for pipetting an analyte and in situ hybridization devices. Examples of sample storage devices are: hotels for possibly cooled and/or air-conditioned storage of samples above one another and/or next one another (preferably at intervals), stackers for intermediate storage of samples and/or for storing and providing empty holding devices (preferably stacked directly on one another).

Particularly for use in hotels or in temperature-controlled microplate stations, the production of the holding devices according to the present invention from a heat-conducting and/or thermally stable plastic, and/or from a metal such as aluminum, is advantageous. The material for this is preferably suitable for injection molding, temperature resistant up to temperatures of over 90° C. (preferably sterilizable), and resistant to greatly varying inorganic reagents. Each holding device preferably has a barcode for simple and automatic identification of each holding device—as is preferred, for example, in hotels or even in fully automated processing systems. This barcode may, for example, be spray-painted, printed, glued, or cut out and/or engraved in or on the holding device.

As an alternative to the embodiments shown, spring elements 12 may be metal springs inserted in holding device 1 and/or attached thereon. The holding devices are, however, preferably produced in one piece from one single material. Alternatively, object carriers and/or carriers 2 may be glued, pressed, or otherwise fixed onto a holding device 1 and/or into its depressions 11. Object carriers 2 may also be inserted into an injection mold and the plastic of the holding device may be sprayed onto and/or around these carrier 2 for the purpose of connecting carriers 2 and holding device 1. For holding object carrier 2 without play on and/or in holding device 1 according to the present invention, a pushbutton-latch mechanism known per se, equipped with holding springs (preferably made of metal) or pressure springs, may also be used.

What is claimed is:

1. A frame shaped microplate system object carrier adapter, the adapter being adapted to receive at least one object carrier and comprising:

two parallel lengthwise walls and two parallel transverse walls that extend at substantially right angles to the lengthwise walls, wherein the lengthwise and transverse walls define an essentially rectangular frame with a top portion and a bottom portion, with a region between the lengthwise and transverse walls being an opening which completely traverses the microplate system object carrier adapter, the microplate system object carrier adapter having the shape and external dimensions of a typical microplate;

wherein the lengthwise and transverse walls have an offset on which at least part of an object carrier is adapted to be laid on, a mutual geometric relationships of the offset and the lengthwise and transverse walls defining the dimensions of at least one depression formed around the top portion of the adapter, each depression being shaped and sized to receive one object carrier in a position that is substantially parallel to said top portion, the object carrier having the dimensions of a slide for a light microscopy; and wherein the lengthwise or transverse walls comprise:
(i) at least one stop portion formed on one side of the depression, and
(ii) at least one spring element situated on a side of the depression opposite to the side with the stop portion, the spring element being adapted to directly abut a transverse or a lengthwise side of an inserted object carrier and to exert a spring force on the inserted object carrier, the spring force being directed in a direction that is substantially parallel and/or perpendicular to the surface of the inserted object carrier so as to urge an opposite edge of the object carrier directly against the stop portion.

2. The object carrier adapter according to claim 1, wherein said adapter is shaped so as to enable the object carrier adapter to be engaged by a microplate handling robot.

3. The object carrier adapter according to claim 1, wherein the object carrier adapter comprises a stacking surface profile at the bottom portion of said lengthwise and transverse walls, which substantially corresponds to a stacking surface profile of a standard microplate for placement of the object carrier adapter in a microplate station of a sample analysis system, a sample processing system, and a sample storage system.

4. The object carrier adapter according to claim 1, further comprising at least one intermediate wall substantially parallel to the lengthwise or transverse walls.

5. The object carrier adapter according to claim 4, wherein at least one intermediate wall has an offset area for receiving at least part of an object carrier, the offset area, together with the stop portion and the spring element, defining the depth of the depression with respect to the top portion of the frame.

6. The object carrier adapter according to claim 3, wherein the stacking surface profile includes a stacking surface that extends substantially in a horizontal direction and that is interconnected to a substantially horizontal placement surface by a substantially vertical lower internal surface of said lengthwise and transverse walls.

7. The object carrier adapter according to claim 1, wherein the object carrier adapter is manufactured from plastic.

8. The object carrier adapter according to claim 1, wherein the at least one spring element is produced in one piece with the object carrier adapter.

9. The object carrier adapter according to claim 8, wherein the at least one spring element is integrally molded with the object carrier adapter.

10. The object carrier adapter according to claim 1, wherein said lengthwise wall further comprises at least one grip opening configured for gripping an object carrier.

11. The object carrier adapter according to claim 1, wherein an external surface profile of said lengthwise and transverse walls of the frame includes:
   (i) an essentially horizontal stacking shoulder that is adjoined by an upper external surface; and
   (ii) a lower external surface that is adjoined by an essentially horizontal placement surface,
wherein the upper and lower external surfaces extend in an essentially vertical direction and are interconnected by a step.

12. The object carrier adapter according to claim 1, wherein the stop portion has a downward and inward slope.

13. The object carrier adapter according to claim 1, wherein the object carrier adapter comprises at least two depressions, and wherein the depressions are formed on the same plane.

14. The object carrier adapter according to claim 1, wherein the upper end of the spring element is slanted toward the object carrier such that a spring force is exerted on the transverse or lengthwise edge of the object carrier, wherein the spring force comprises a horizontal component directed against the stop portion and a vertical component directed against an offset.

15. The object carrier adapter according to claim 5, wherein the upper end of the spring element is slanted toward the object carrier such that a spring force is exerted on the transverse or lengthwise edge of the object carrier, wherein the spring force comprises a horizontal component directed against the stop portion and a vertical component directed against an offset area.

16. The object carrier adapter according to claim 1, which is designed to hold within the same plane up to four object carriers, wherein these object carriers have essentially the same dimensions like object carriers for light microscopy.

* * * * *